March 28, 1961  F. R. BAINBRIDGE  2,977,132
FLAT BAR TORSION SPRING SUSPENSION ASSEMBLY FOR TRAILERS
Filed April 19, 1960
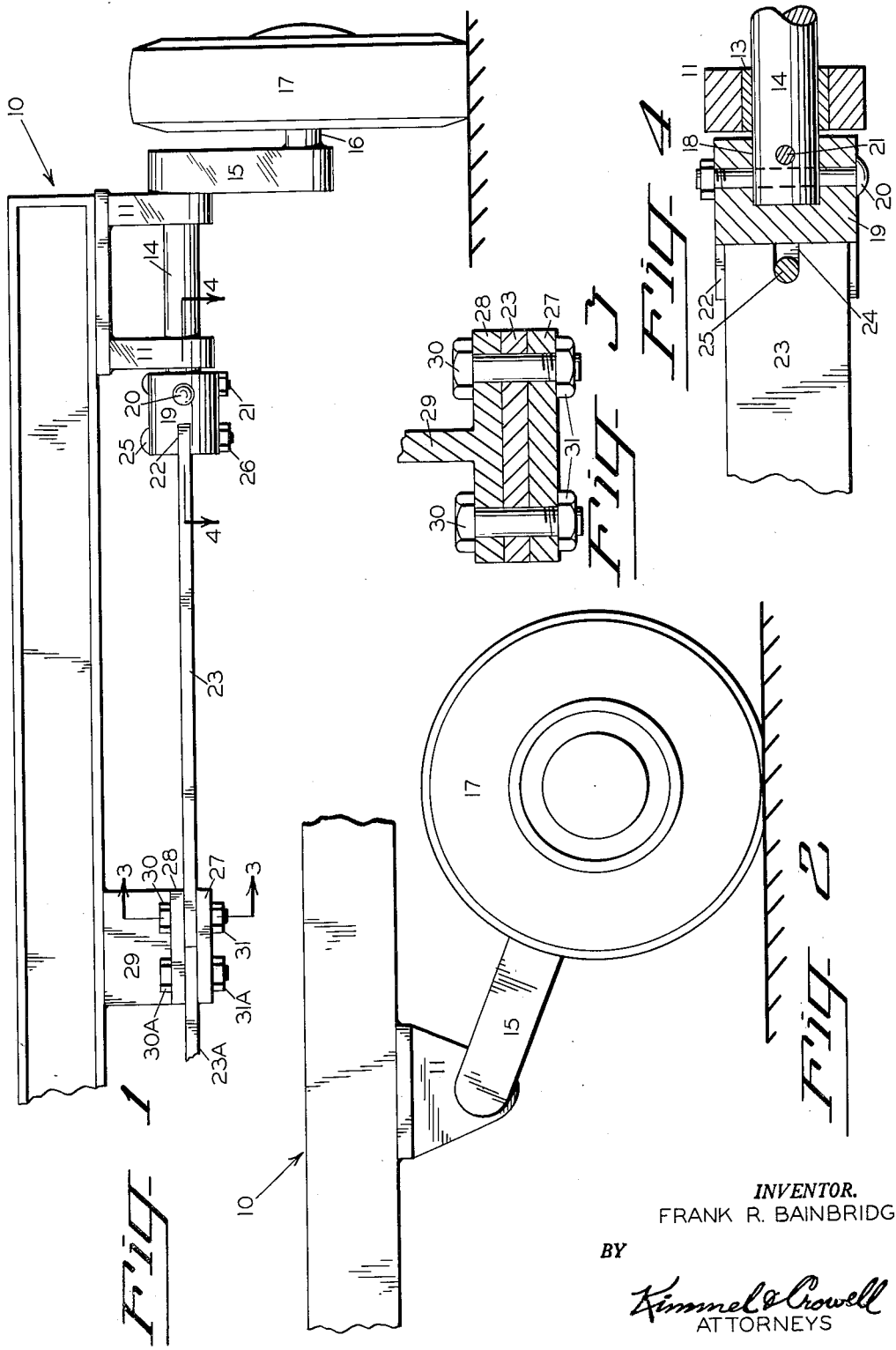
INVENTOR.
FRANK R. BAINBRIDGE
BY
Kimmel & Crowell
ATTORNEYS United States Patent Office 2,977,132
Patented Mar. 28, 1961

2,977,132

FLAT BAR TORSION SPRING SUSPENSION ASSEMBLY FOR TRAILERS

Frank Raymond Bainbridge, 1344 N. 5th St., Springfield, Oreg.

Filed Apr. 19, 1960, Ser. No. 23,310

1 Claim. (Cl. 280—124)

This invention relates to a wheel suspension for trailers, and more particularly to a torsion bar wheel suspension for trailers such as boat trailers or the like.

A primary object of the invention is the provision of means for suspending the wheels of the trailer from its frame by torsion bar system.

An additional object of the invention is the provision of a standard trailer frame including a torsion bar suspension for the wheels wherein the torsion bars are interchangeable in accordance with the load carried by the trailer.

Still another object of the invention is the provision of a torsion bar wheel suspension of this character wherein the wheels are individually suspended, so that the relative strength of the torsion bar may be varied when desirable for increase of weight on one side or the other of the trailer which would otherwise result in an uneven load.

A still further object of the invention is the provision of such a torsion bar suspension system whereby a relative maximum load clearance may be provided with a minimum of trailer height.

Still other objects reside in the combinations of elements, arrangements of parts, and features of construction, all as will be more fully pointed out hereinafter and disclosed in the accompanying drawing.

Still other objects will in part be obvious and in part be pointed out hereinafter and shown in the drawing wherein:

Figure 1 is a fragmentary and elevational view of a trailer frame including a portion of the torsion bar suspension assembly of the instant invention.

Figure 2 is a fragmentary side elevational view of the construction of Fig. 1.

Figure 3 is an enlarged sectional view taken substantially along the line 3—3 of Fig. 1 as viewed in the direction indicated by the arrows, and Figure 4 is an enlarged fragmentary sectional view taken substantially along the line 4—4 of Fig. 1 as viewed in the direction indicated by the arrows.

Similar reference characters refer to similar parts throughout the several views of the drawing.

Having reference now to the drawing in detail, there is generally indicated at 10 a fragment of the rear end of a trailer frame, such as a boat trailer.

Only one side of the frame is shown, as the arrangement of the opposite side is substantially identical.

From the rear corner of frame 10 a pair of lugs 11 depend vertically and have mounted therein bearings 13 a rotatable stub shaft 14. The shaft 14 has fixedly secured to its outer end a wheel supporting arm 15, which in turn carries a stub axle 16, upon which is mounted a conventional rubber-tired trailer wheel 17.

The inner end of shaft 14 engages in a bore 18 in a cylindrical adaptor 19, and is held in position by crossed bolts 20 and 21. A slot 22 in the other end of adaptor 19 has seated therein the end of a torsion bar 23, the bar being slotted as at 24, to receive a clamping bolt 25, which serves to hold the end of the bar in place, but which may be readily released by means of a nut 26 to permit the replacement of the torsion bar 23. The other end of torsion bar 23 seats between a clamping plate 27 and flange 28 of a T-shaped lug 29 which is fixedly secured to the underside of frame 10. A pair of clamping bolts 30 extend through aligned apertures of the flange 28, the plate 27 and the torsion bar 23. The assembly is clamped together by means of nuts 31, the arrangement being such that release of the nuts 31 will permit the removal of the torsion bar 23 for replacement as desired.

A similar torsion bar 23A which is correspondingly secured by bolts 30A and nuts 31A extends to the opposite wheel to which it is connected in the identical manner previously described.

From the foregoing the operation of the device should be readily understandable. The arrangement of the offset arm 15 permits a relatively low mounting of the wheel 17 relative to the frame 10. Any strain or impact as well as excessive weight carried by the wheel 17 is transmitted through the shaft 14 to the torsion bar 23, which in turn relieves the load thereon. By virtue of the nuts 26 and 31 and the bolts 25 and 30 the torsion bar 23 may be readily interchanged with another of greater or less strength, in accordance with the load to be carried. Similarly, torsion bars 23 and 23A of different strengths may be imposed when the weight load of the trailer 10 is uneven.

From the foregoing it will now be seen that there is herein provided an improved torsion bar wheel suspension for trailers or the like, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In combination with a trailer frame having a transverse member, a pair of spaced lugs dependingly secured to each end of said transverse member, each pair of lugs having aligned apertures therein, a bearing in each of said apertures, a stub axle rotatably journalled in the bearings of each pair of lugs, a wheel supporting arm secured at one end to each stub axle, an additional stub axle carried by the other end of each arm, a wheel carried by each additional stub axle, the end of each of said first-mentioned stub axles extending interiorly toward the center of said transverse member beyond the innermost of its associated lugs, an adapter carried by each inwardly extending end, each said adapter comprising a cylindrical member having a bore in one end and a transverse normally horizontal slot in the other end, the extending end of a first-mentioned stub axle extending in each bore, crossed bolts extending through aligned bores in each adapter and its associated extending end securing said end in said bore, a relatively flat normally horizontal torsion bar having one end seating in each slot, said one end of each said torsion bar having a slot therein, bores in each said adapter perpendicular to said slot in said adapter and aligned with said slot in said one end of said torsion bar, a clamping bolt extending through said last-mentioned bores and said slots in said adapter and said one end of said torsion bar clampingly to hold said one end of said torsion bar in said slot in said adapter, an inverted T-shaped lug centrally positioned in depending relation on said transverse member, each flange of the head of said T-shaped lug having a pair of spaced bolt holes therein, the other end of each torsion bar having a bolt hole therein aligned with a bolt hole in the head of said T-shaped lug, said other end of each torsion bar terminating beneath the head of said T-shaped lug, the ends of said torsion bars being in abutting relation, a clamping plate having bolt holes therein aligned with the bolt holes in the head of said T-shaped member, and said torsion bar, and bolts extending through the aligned bolt holes clampingly and releasably securing said other ends of said torsion bars to said T-shaped lug.

References Cited in the file of this patent
UNITED STATES PATENTS

| | | |
|---|---|---|
| 2,497,072 | Cooper | Feb. 14, 1950 |
| 2,540,279 | Mosier | Feb. 6, 1951 |
| 2,779,602 | Kimbro | Jan. 29, 1957 |